US008839618B1

(12) United States Patent
Blottman, III et al.

(10) Patent No.: US 8,839,618 B1
(45) Date of Patent: Sep. 23, 2014

(54) IONIC BUOYANCY ENGINE

(71) Applicants: John B. Blottman, III, North Andover, MA (US); Barbar J. Akle, Jounieh (LB)

(72) Inventors: John B. Blottman, III, North Andover, MA (US); Barbar J. Akle, Jounieh (LB)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 155 days.

(21) Appl. No.: 13/623,930

(22) Filed: Sep. 21, 2012

(51) Int. Cl.
  *F03B 17/02* (2006.01)
(52) U.S. Cl.
  USPC .................. 60/496; 60/495; 441/21; 114/330; 114/331; 114/333
(58) Field of Classification Search
  CPC .......... Y02E 10/36; F03B 17/00; F03B 17/02
  USPC ........... 60/495, 496, 501; 441/21; 290/42, 53; 114/330, 331, 333
  See application file for complete search history.

(56) References Cited

U.S. PATENT DOCUMENTS

| 5,224,074 | A  | * | 6/1993  | Sullivan      | 367/3   |
| 7,656,051 | B2 | * | 2/2010  | Perin         | 290/43  |
| 7,845,303 | B2 | * | 12/2010 | Hawkes        | 114/312 |
| 2010/0064958 | A1 | * | 3/2010 | Cameron et al. | 114/331 |

OTHER PUBLICATIONS

Barbar Akle, Wassim Habchi, Rita Adbelnour, John Blottman, and Donald Leo, Biologically Inspired Highly Efficient Buoyancy Engine, paper, Mar. 2012.

* cited by examiner

*Primary Examiner* — Thomas Denion
*Assistant Examiner* — Xiaoting Hu
(74) *Attorney, Agent, or Firm* — James M. Kasischke; Michael P. Stanley

(57) ABSTRACT

A buoyancy engine is provided for use in a saltwater environment. The engine includes a gas filled housing and a buoyancy chamber in the housing. An elastomeric membrane is positioned between the buoyancy chamber interior and the housing interior. A semi-permeable membrane is provided between the buoyancy chamber interior and the saltwater environment. Two electrodes can be positioned with both electrodes in the buoyancy chamber or with one electrode being positioned in the buoyancy chamber and the other being positioned in the saltwater environment. A controller is joined to at least one of the electrodes for controlling an electrical potential between the two electrodes. A power source provides power to the controller.

15 Claims, 2 Drawing Sheets

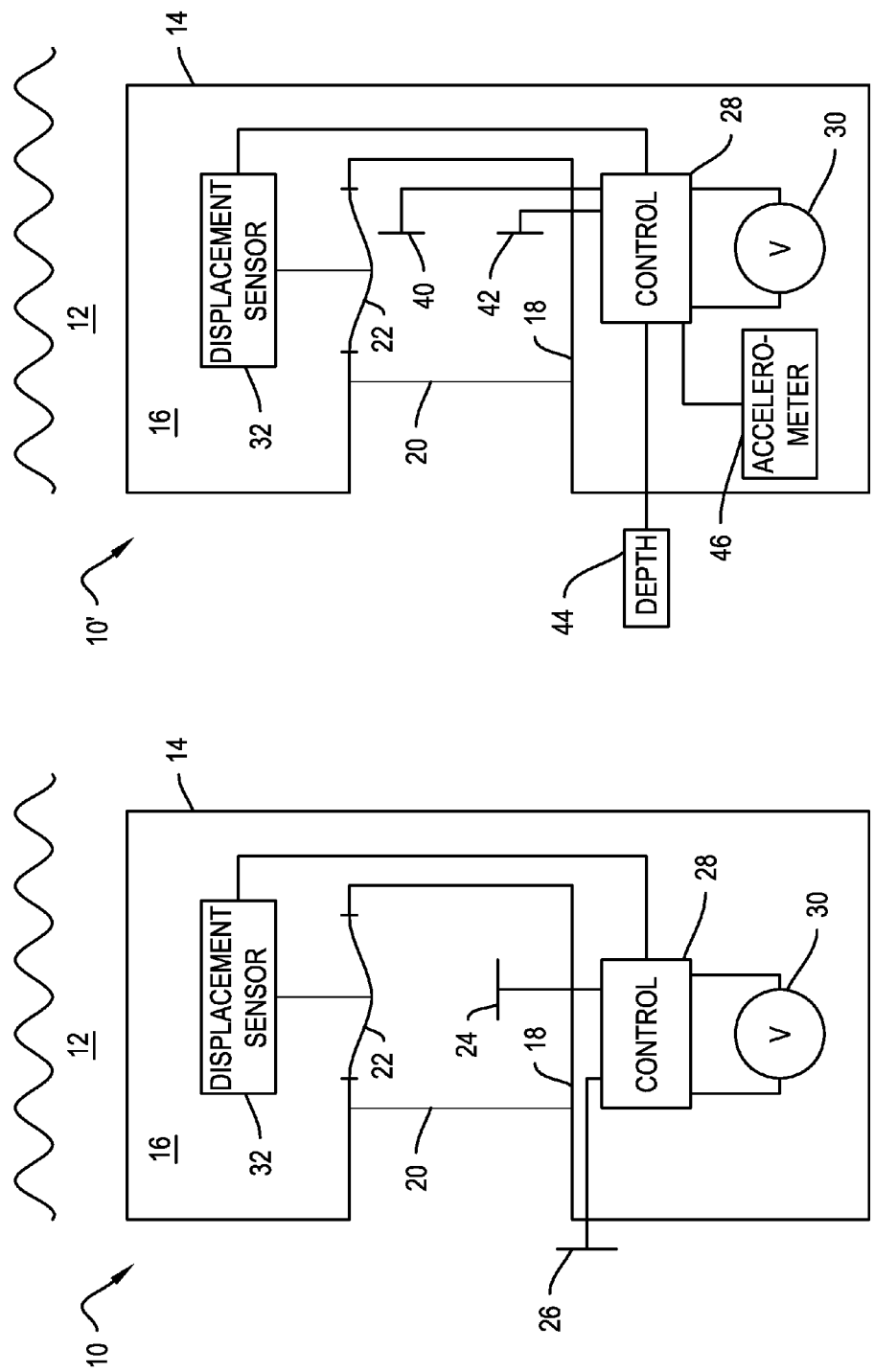

IONIC BUOYANCY ENGINE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The current invention relates to a device capable of electrically controlling buoyancy.

(2) Description of the Prior Art

Undersea distributed sensor systems require a miniaturization of platforms and a means of both spatial and temporal persistence. One aspect of this system is the necessity to modulate depth for optimal positioning, station-keeping and as a means of communicating data among and between deployed systems.

In engineering applications, most buoyancy control is performed using an air/liquid chamber. In submarines, air tanks are filled with sea water for sinking and refilled with the pressurized air to float. The density of the submarine changes as the mass is altered at constant volume. Buoyancy compensator devices used by divers inflate and deflate bags of air, manipulating density by volume increase at constant mass. It is also known to use electrolysis to generate hydrogen and oxygen gas which replace the water in a gas chamber resulting in increased buoyancy.

Each of these approaches has deficiencies when applied to miniaturized and low-power systems. Gas displacement and air bag systems require gas storage and utilize an expendable resource. Electrolysis systems consume too much power.

SUMMARY OF THE INVENTION

A first object of the invention is to provide a buoyancy engine that utilizes a low amount of electrical power.

A second object of the invention is to provide a buoyancy engine that can be cycled from high buoyancy to low buoyancy without discharging a consumable.

Accordingly, there is provided a buoyancy engine for use in a saltwater environment. The engine includes a gas filled housing and a buoyancy chamber in the housing. An elastomeric membrane is positioned between the buoyancy chamber interior and the housing interior. A semi-permeable membrane is provided between the buoyancy chamber interior and the saltwater environment. Two electrodes can be positioned with both electrodes in the buoyancy chamber or with one electrode being positioned in the buoyancy chamber and the other being positioned in the saltwater environment. A controller is joined to at least one of the electrodes for controlling an electrical potential between the two electrodes. A power source provides power to the controller.

In other embodiments, sensors can provide indications of buoyancy chamber volume, depth and acceleration to the controller. A controllable valve can also be provided for equalizing pressure and ionic concentrations between the buoyancy chamber interior and the environment. Additional electrodes can be provided to further control ionic concentrations.

Other objects and advantages of the present invention will become apparent from the following description, drawings and claims.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 1 is a diagram of a first embodiment of the buoyancy engine;

FIG. 2 is a diagram of a second embodiment of the buoyancy engine; and

DETAILED DESCRIPTION OF THE INVENTION

Figure 3:
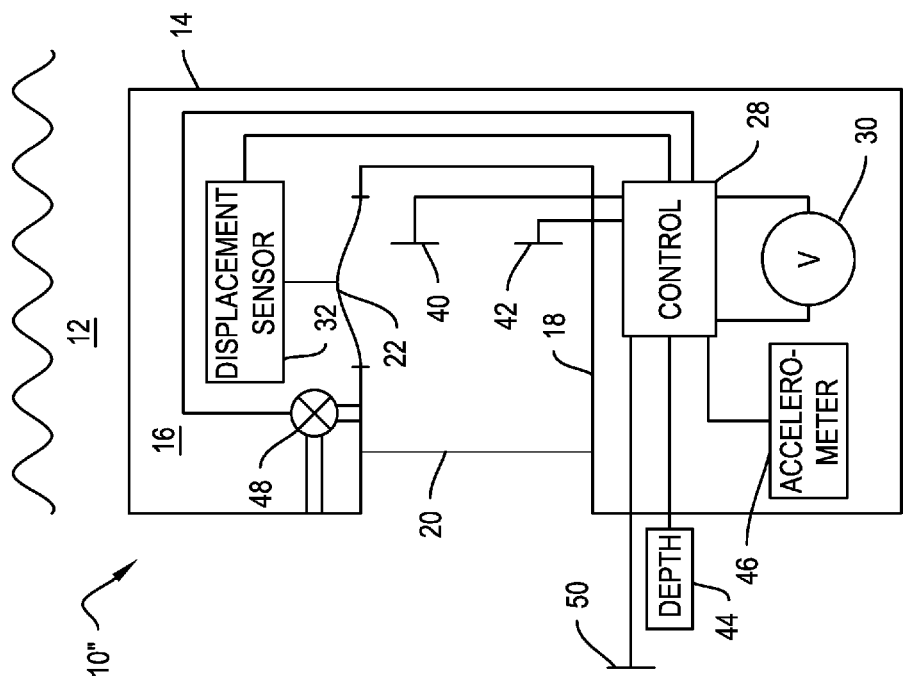
FIG. 3 is a diagram a third embodiment of the buoyancy engine.

FIG. 1 shows a basic embodiment of the buoyancy engine 10. Engine 10 is operable in an environment 12 having a dissolved ionic solution such as sea water. Buoyancy engine 10 has a housing 14 having an interior 16 filled with a compressible fluid such as a gas or air. A buoyancy chamber 18 is positioned within housing 14. Buoyancy chamber 18 has a wall portion sealed by a semi-permeable membrane 20 such that the interior of buoyancy chamber 18 is on one side of membrane 20 and the other side of the membrane 20 is in communication with environmental fluid 12. Semi-permeable membrane 20 can be a semi-permeable membrane, an ion exchange membrane or polymer electrolyte membrane such as NAFION™ 117, FLEMION™ or another such membrane. Membrane 20 allows transport of water and small cations such as Na+ across membrane 20. It is expected that an anion exchange membrane could also work in this invention. Another wall portion of buoyancy chamber 18 is sealed by an elastic membrane 22. (Elastic membrane 22 is effectively impermeable.) Elastic membrane 22 is positioned between the interior of buoyancy chamber 18 and the interior 16 of housing 14.

Buoyancy engine 10 operates by electrical control of ionic transport across semi-permeable membrane 20. For this purpose, a first electrode 24 is positioned within buoyancy chamber 18. A second electrode 26 is positioned outside buoyancy chamber 18 in communication with environmental fluid 12. First electrode 24 and second electrode 26 are joined to a controller 28. Controller 28 is joined to a power supply 30. Controller 28 is capable of controlling the electrical polarity, charge and potential difference between first electrode 24 and second electrode 26.

An optional displacement sensor 32 can also be in communication with controller 28. Displacement sensor 32 can be any sensor capable of measuring the change in the volume of the buoyancy chamber 18 in response to osmosis. In one embodiment, a laser vibrometer is used as displacement sensor 32; however, strain gauges or other displacement measurement devices can be used for this purpose. By having displacement measurement, controller 28 can have feedback concerning the effectiveness of the electrodes in causing osmosis into and out of the buoyancy chamber.

In operation, controller 28 can increase or decrease buoyancy by applying a positive or negative potential difference between first electrode 24 and second electrode 26. The potential difference causes ions to gather at the first and second electrode 24 and 26. Cations will also transport across the semi-permeable membrane 20 exposed to environmental fluid 12. Ions inside buoyancy chamber 18 will gather near first electrode 24, reducing concentration of ions on the interior side of membrane 20. This creates concentration gradient between the environmental fluid side of the membrane 20 and the interior of buoyancy chamber 18. Environmental water passes through membrane 20 from the less concentrated side of the membrane to the more concentrated side. This causes elastic membrane 22 to expand in to the interior of buoyancy chamber 18, for a positive applied potential, reducing the volume of water inside buoyancy chamber 18. The reduced volume of water makes buoyancy engine 10 more buoyant because it has a lower mass. Buoyancy can be maintained by eliminating the potential difference between first electrode 24 and second electrode 26. Original buoyancy can be restored by reversing the polarity on the electrodes.

FIG. 2 shows an alternative embodiment of the buoyancy engine 10'. In this embodiment, first electrode 40 and second electrode 42 are both positioned within buoyancy chamber 18. This embodiment also includes a depth sensor 44 and an accelerometer 46 joined to controller 28. These sensors will allow additional feedback to controller 28 concerning buoyancy engine 10' movement and positioning.

In operation, controller 28 creates a potential difference between electrodes 40 and 42. Negative ions within the buoyancy chamber 18 gather around the anode, and positive ions gather around the cathode. This reduces the number of ions at semi-permeable membrane 20 and reduces the concentration of the solution at the interior side of membrane 20. As above, environmental water passes through membrane 20 from the less concentrated side of the membrane to the more concentrated side. Elastic membrane 22 expands into buoyancy chamber 18, reducing the volume of water inside buoyancy chamber 20. The reduced volume of water makes buoyancy engine 10' more buoyant because it has a lower mass. Original buoyancy can be restored by short circuiting the electrodes.

FIG. 3 shows another embodiment of the buoyancy engine 10". This embodiment incorporates a valve 48 in communication between the interior of buoyancy chamber 18 and the environment 12. Valve 48 is joined to controller 28 to allow opening and closing valve 48. Valve 48 allows equalization of pressure and salinity between buoyancy chamber 18 and the environment 12, to quickly stabilize buoyancy engine 10" at a given depth. A third electrode 50 is positioned outside buoyancy chamber 18. When the buoyancy engine 10" is required to move deeper than that achieved with neutral buoyancy, a negative potential difference between the third electrode 50 and electrodes 40 and 42 will reverse the concentration gradient. Environmental water and ions enter buoyancy chamber 18 causing elastic membrane 22 to expand. This adds mass and makes buoyancy engine 10" less buoyant. In additional embodiments one or more additional sensors such as temperature sensors and salinity sensors can be positioned in the environment and joined to controller 28. These additional sensors allow more precise control of buoyancy.

The buoyancy engine presented herein is a device that has a constant volume and a controllable mass. The mass is varied by transferring water in and out of a chamber with constant volume. Water motion is regulated by the local changes in concentration of sodium and chloride ions. The concentration change is in turn controlled by an electric current.

A buoyancy engine with both electrodes inside the chamber as in FIG. 2 operates as follows. An electric potential of less than 1 volt is applied across the electrodes. Cations migrate toward the cathode while anions migrate toward the anode. A region of a large ionic concentration around the electrode and lower concentration near the semi-permeable membrane is produced. As the environment in the region of the engine has constant salinity, the difference between the concentration across the membrane results in osmotic pressure. The pressure leads to water migration from the chamber. The elastomeric bladder expands into the chamber to compensate for the water loss and the total volume remains constant. The engine becomes more buoyant as density decreases.

The operating voltage of the proposed engine can be lower than the electrolysis potential of 1.1 V. Electrolysis is undesired as it uses significant power and introduces gasses into the buoyancy chamber. Operation at low voltages results in a highly efficient design. The engine is repeatable since water could be lost and recovered allowing the engine to sink and then float upon control.

This buoyancy engine relies on local concentration changes around a semi-permeable membrane. The local change leads to water flowing in and out of a constant volume chamber, hence controlling the buoyancy of the device. The design is highly efficient, miniaturization capable, and does not contain any moving parts.

Experimental results suggest that such an engine has an energy consumption of 1 Joule for a displaced volume of 1 mm$^3$ of water. In the experiment, electrodes were placed with both inside the chamber as in FIG. 2 or on opposite sides of the semi-permeable membrane as in FIG. 1. Having both electrodes inside the chamber resulted in a larger amount of water being transferred out of the engine. Having electrodes on opposite sides resulted in a flow of water in or out of the engine depending on the polarity of the applied potential. By testing electrodes having different configurations, it was discovered that the amount of water transferred increased by increasing the surface area of the electrodes.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A buoyancy engine for use in a saltwater environment comprising:
   a housing having an interior filled with a gas;
   a buoyancy chamber positioned in said housing and having a buoyancy chamber interior, a first aperture in communication between said buoyancy chamber interior and said housing interior and a second aperture configured to be in communication with the saltwater environment, said buoyancy chamber interior being filled with saltwater;
   an elastomeric membrane covering said buoyancy chamber first aperture and sealing said buoyancy chamber interior from said housing interior, said elastomeric membrane configured to expand into said buoyancy chamber interior and thereby decrease the volume of said buoyancy chamber interior and expand into said housing interior and thereby increase the volume of said buoyancy chamber interior;

a semi-permeable membrane covering said buoyancy chamber second aperture and sealing said buoyancy chamber interior from an external environment;

a first electrode positioned in said buoyancy chamber interior;

a second electrode positioned external to said buoyancy chamber and said housing;

a controller joined to at least one of said first electrode and said second electrode and configured to control the electrical potential between said first electrode and said second electrode; and a power source joined to said controller.

2. The buoyancy engine of claim 1 wherein said semi-permeable membrane is an ion transport membrane that permits water and small cations to cross from a first side of said semi-permeable membrane to a second side of said semi-permeable membrane.

3. The buoyancy engine of claim 1 further comprising a displacement sensor joined to said controller and being configured to measure displacement of said elastomeric membrane and to communicate the displacement to said controller.

4. The buoyancy engine of claim 3 wherein said displacement sensor is a laser displacement sensor.

5. The buoyancy engine of claim 1 further comprising a depth sensor configured to detect depth in the saltwater environment and joined to communicate the detected depth to said controller.

6. The buoyancy engine of claim 1 further comprising an accelerometer positioned to detect acceleration of said housing and joined to communicate the detected acceleration to said controller.

7. A buoyancy engine for use in a saltwater environment comprising:

a housing having an interior filled with a gas;

a buoyancy chamber positioned in said housing and having a buoyancy chamber interior, a first aperture in communication between said buoyancy chamber interior and said housing interior and a second aperture configured to be in communication with the saltwater environment, said buoyancy chamber interior being filled with saltwater;

an elastomeric membrane covering said buoyancy chamber first aperture and sealing said buoyancy chamber interior from said housing interior, said elastomeric membrane configured to expand into said buoyancy chamber interior and thereby decrease the volume of said buoyancy chamber interior and expand into said housing interior and thereby increase the volume of said buoyancy chamber interior;

a semi-permeable membrane covering said buoyancy chamber second aperture and sealing said buoyancy chamber interior from an external environment;

a first electrode positioned in said buoyancy chamber interior;

a second electrode positioned external to said buoyancy chamber and said housing;

a controller joined to at least one of said first electrode and said second electrode and configured to control the electrical potential between said first electrode and said second electrode; and a power source joined to said controller; and a controllable valve joined between said buoyancy chamber and the exterior of said housing, said controllable valve being joined to said controller for opening and closing said controllable valve.

8. A buoyancy engine for use in a saltwater environment comprising:

a housing having an interior filled with a gas;

a buoyancy chamber positioned in said housing and having a buoyancy chamber interior, a first aperture in communication between said buoyancy chamber interior and said housing interior and a second aperture configured to be in communication with the saltwater environment, said buoyancy chamber interior being filled with saltwater;

an elastomeric membrane covering said buoyancy chamber first aperture and sealing said buoyancy chamber interior from said housing interior, said elastomeric membrane being configured to expand into said buoyancy chamber interior and thereby decrease the volume of said buoyancy chamber interior and expand into said housing interior and thereby increase the volume of said buoyancy chamber interior;

a semi-permeable membrane covering said buoyancy chamber second aperture and sealing said buoyancy chamber interior from an external environment;

a first electrode positioned in said buoyancy chamber interior;

a second electrode positioned in said buoyancy chamber interior;

a controller joined to at least one of said first electrode and said second electrode and configured to control the electrical potential between said first electrode and said second electrode; and a power source joined to said controller.

9. The buoyancy engine of claim 8 further comprising a third electrode positioned external to said buoyancy chamber and said housing, said third electrode being joined to said controller.

10. The buoyancy engine of claim 8 wherein said semi-permeable membrane is an ion transport membrane that permits water and small cations to cross from a first side of said semi-permeable membrane to a second side of said semi-permeable membrane.

11. The buoyancy engine of claim 8 further comprising a displacement sensor joined to said controller and configured to measure displacement of said elastomeric membrane and to communicate the displacement to said controller.

12. The buoyancy engine of claim 11 wherein said displacement sensor is a laser displacement sensor.

13. The buoyancy engine of claim 8 further comprising a depth sensor configured to detect depth in the saltwater environment and joined to communicate the detected depth to said controller.

14. The buoyancy engine of claim 8 further comprising an accelerometer positioned to detect acceleration of said housing and joined to communicate the detected acceleration to said controller.

15. A buoyancy engine for use in a saltwater environment comprising:

a housing having an interior filled with a gas;

a buoyancy chamber positioned in said housing and having a buoyancy chamber interior, a first aperture in communication between said buoyancy chamber interior and said housing interior and a second aperture configured to be in communication with the saltwater environment, said buoyancy chamber interior being filled with saltwater;

an elastomeric membrane covering said buoyancy chamber first aperture and sealing said buoyancy chamber interior from said housing interior, said elastomeric membrane being configured to expand into said buoyancy chamber interior and thereby decrease the volume of said buoyancy chamber interior and expand into said housing interior and thereby increase the volume of said buoyancy chamber interior;
a semi-permeable membrane covering said buoyancy chamber second aperture and sealing said buoyancy chamber interior from an external environment;
a first electrode positioned in said buoyancy chamber interior;
a second electrode positioned in said buoyancy chamber interior;
a controller joined to at least one of said first electrode and said second electrode and configured to control the electrical potential between said first electrode and said second electrode;
a power source joined to said controller; and
a controllable valve joined between said buoyancy chamber and the exterior of said housing, said controllable valve being joined to said controller for opening and closing said controllable valve.

* * * * *